United States Patent
Iwasaki et al.

(10) Patent No.: US 7,981,940 B2
(45) Date of Patent: Jul. 19, 2011

(54) METHOD OF TREATING SEALING COMPOUND AND APPARATUS FOR TREATING THE SAME

(75) Inventors: Shinichi Iwasaki, Tokyo (JP); Rieko Iwasaki, legal representative, Tokyo (JP); Ryuji Izumoto, Kodaira (JP); Daisuke Sugio, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 702 days.

(21) Appl. No.: 11/569,559

(22) PCT Filed: May 26, 2005

(86) PCT No.: PCT/JP2005/009612
§ 371 (c)(1),
(2), (4) Date: Apr. 17, 2008

(87) PCT Pub. No.: WO2005/116115
PCT Pub. Date: Dec. 8, 2005

(65) Prior Publication Data
US 2009/0200243 A1    Aug. 13, 2009

(30) Foreign Application Priority Data

May 26, 2004  (JP) .................................. 2004-155959
Aug. 27, 2004  (JP) .................................. 2004-248222
Dec. 15, 2004  (JP) .................................. 2004-363139

(51) Int. Cl.
*C08J 11/04*    (2006.01)
(52) U.S. Cl. ............. 521/41; 521/40; 521/40.5; 521/44; 152/502; 152/503; 152/504; 523/166; 528/480; 528/495; 156/110.1; 156/115

(58) Field of Classification Search ............... 521/40, 521/40.5, 41, 45, 45.5, 42.5, 43, 44; 523/166; 141/38; 156/110.1, 115; 152/502, 503, 504, 152/505, 506; 528/480, 495
See application file for complete search history.

(56) References Cited

U.S. PATENT DOCUMENTS

| | | | |
|---|---|---|---|
| 3,727,412 A * | 4/1973 | Marx et al. ................... | 405/264 |
| 5,128,392 A * | 7/1992 | DeTrano et al. .............. | 523/166 |
| 5,357,636 A * | 10/1994 | Dresdner et al. ............... | 2/161.7 |
| 5,927,348 A | 7/1999 | Gerresheim et al. | |

FOREIGN PATENT DOCUMENTS
JP    2002-226636 A    8/2002

* cited by examiner

*Primary Examiner* — James Seidleck
*Assistant Examiner* — Frances Tischler
(74) *Attorney, Agent, or Firm* — Sughrue Mion, PLLC

(57) ABSTRACT

Provided is a method of treating a sealing compound, in order to recover from the inside of a pneumatic tire the sealing compound that was used for repairing a puncture, the sealing compound including an aqueous solution having at least rubber latex dispersed therein, the method comprising: solid-liquid separating, by injecting a treating agent into the inside of a pneumatic tire into which the sealing compound was injected, the treating agent comprising at least one of a salt that is a reaction compound of an acid and a base and/or a water-soluble organic solvent, mixing the treating agent with the sealing compound inside the pneumatic tire, and aggregating and solidifying the rubber latex in the sealing compound.

8 Claims, 3 Drawing Sheets

METHOD OF TREATING SEALING COMPOUND AND APPARATUS FOR TREATING THE SAME

TECHNICAL FIELD

The present invention relates to a method of treating a sealing compound for recovering and treating a sealing compound from a used sealing compound, and an apparatus for treating a sealing compound. More specifically, the invention relates to a method of treating a sealing compound suitable for treating a used liquid sealing compound injected into a punctured pneumatic tire, and an apparatus for treating a sealing compound.

BACKGROUND ART

As measures at puncturing of a pneumatic tire, a spare tire is carried in an automobile or the like. Upon puncturing, the driver replaces the punctured tire with the spare tire.

Incidentally, along with the increase in female drivers, measures have been desired to date that eliminate the need for work to replace a punctured tire with a spare tire. In addition, there has been a desire to minimize or remove a space of placing a spare tire in automobiles and so forth. In response to these demands, a kit for repairing a punctured tire has recently been commercially available that combines rubber latex and a compressor for filling air.

This kit includes a sealing compound (repairing liquid) to be injected into this pneumatic tire when a pneumatic tire put on a four-wheel car, a two-wheeler, or the like is punctured. The sealing compound is a material in which natural rubber or synthetic rubber or latex of a mixture thereof, and an antifreeze made of water, ethylene glycol or polypropylene glycol, and the like are blended.

In a vehicle only equipped with such a puncture repairing kit, a sealing compound included in a puncture repairing kit is injected into a punctured tire, when the pneumatic tire (hereinafter, simply called a "tire") put on it is punctured, without replacing the tire and wheel. A hole of a tire caused by a puncture is sealed with this sealing compound for temporary repair of the tire, and then the vehicle is driven to a repair service such as a gas station or the like.

In the repair service, the puncture of the tire temporarily repaired with the sealing compound is repaired and this already repaired tire is put on the vehicle again, or the punctured tire is disposed without repairing, depending on the conditions of the hole of puncture. In either case, the sealing compound needs to be extracted out of the inside of the tire. Concerning the sealing compound extracted out of the inside of the tire, treatment depending on the composition of the sealing compound is carried out so as not to contaminate the environment. Thereafter, the final disposal such as disposal, incineration, or the like must be performed. Such a sealing compound is primarily composed of an aqueous solution having rubber latex dispersed therein, with a resin-based adhesive, a fiber material, an antifreezing agent, a pH adjusting agent, an emulsifying agent and the like added thereto.

Incidentally, a sealing compound injected into a pneumatic tire is recovered in a vessel prior to tire replacement, thereby enabling the prevention of splash of the sealing compound. In this recovery, a hose or the like is connected to the valve fitting hole of the tire and then the sealing compound is recovered in the vessel through this hole or the like and is treated in the form of liquid as an industrial waste liquid. As such, the waste liquid needs to be stored until reaching a specified amount.

Moreover, there is a problem in that the work for recovering a sealing compound from the inside of a tire takes time.

For the purpose of the efficient treatment of a sealing compound as described above, the rubber latex in the sealing compound is solidified to be separated from the sealing compound as a solid constituent (solid-liquid separation), and then this solid constituent and the remaining liquid constituent each are preferably separately treated. These specific treating methods involve, for example, for the solid constituent, carrying out the removal of impurities, dewatering, drying and the like, thus enabling reusing (recycling) as a rubber material or incineration, landfill, or the like after dewatering and drying, and for the liquid constituent, carrying out, as required, simple purification treatment such as neutralization, dilution, precipitation and the like, thus enabling discharging to sewer system for industrial waste water.

As a specific measure, a method of treating a sealing compound has been proposed that involves injecting an aqueous organic weak acid solution into a pneumatic tire, aggregating the rubber latex contained in a used sealing compound to adhere to the inner surface of the tire as well as neutralizing the separated fluid and rendering the resulting material unharmful (e.g., see Patent Document 1). This method of treating a sealing compound involves pouring a treating agent having mainly an aqueous acid solution with a pH of 1.6 to 1.8 into a sealing compound comprised of an aqueous basic solution having rubber latex dispersed therein and thereby aggregating the rubber latex in the sealing compound to separate the sealing compound into a solid constituent (rubber latex) and a liquid constituent as well as to neutralize the liquid constituent. Also, Patent Document 1 describes that the acid constituting the treating agent is selected from the group consisting of hydrochloric acid, sulfuric acid, nitric acid, phosphoric acid, carbonic acid, acetic acid, formic acid, citric acid, tartaric acid, salicylic acid, phthalic acid, malonic acid, maleic acid, chloroacetic acid, dichloroacetic acid, and oxalic acid.

Patent Document 1: Japanese Patent Laid-Open No. 2002-226636

DISCLOSURE OF THE INVENTION

Problems to be Solved by the Invention

In Patent Document 1, however, an aqueous organic weak acid solution needs to be put into each pneumatic tire, indicating a drawback of workability being not so good. Moreover, the amount of used sealing compound inside a pneumatic tire is not known, and therefore it is necessary to inject a large amount of an aqueous organic weak acid solution into the tire, which has a drawback of increasing the cost.

On the other hand, a sealing compound generally used at present is not always basic. In particular, many sealing compounds using synthetic rubber latex that does not need the addition of ammonia for stability are at a neutral pH or sufficiently near neutral pH. Injection of a treating agent mainly containing an aqueous acid solution described in Patent Document 1 into such a sealing compound of an approximately neutral pH makes it possible to separate the sealing compound into a solid constituent (rubber latex) and a liquid constituent. However, the agglomerated rubber latex contains an acid solution and the remaining liquid constituent is an acid solution. As such, the rubber latex and the liquid constituent each must be neutralized in different steps, for rendering these unharmful, which could pose problems in that the cost and time for treating the sealing compound are rather increased.

Moreover, when a treating agent made of mainly an aqueous acid solution is used as a treating agent for carrying out solid-liquid separation, the treating agent itself reaches a considerable price and also quite attention must be paid to maintenance and control including a storage vessel and storage place, which is a factor of increasing the treating cost of the sealing compound.

The present invention, considering the above facts, is directed to providing a method of treating a sealing compound that can efficiently separate a used sealing compound into rubber latex and a liquid constituent and recover them, and also simplify the treatment of the rubber latex and liquid constituent separated from the used sealing compound.

The invention, considering the above facts, is also directed to providing a method of treating a sealing compound that can efficiently recover a sealing compound at a low cost, and an easy-to-use apparatus for treating a sealing compound.

Means for Solving the Problems

A method of treating a sealing compound according to claim 1 of the invention is a method of treating a sealing compound for recovering from the inside of a pneumatic tire, a sealing compound for repairing a puncture, the sealing compound including an aqueous solution having at least rubber latex dispersed therein, the method being characterized by comprising a solid-liquid separating step of injecting a treating agent containing at least one of a salt that is a reaction compound of an acid and/or a base and a water-soluble organic solvent into the inside of the pneumatic tire having the sealing compound injected thereinto, mixing the treating agent with the sealing compound inside the pneumatic tire, and aggregating and solidifying the rubber latex in the sealing compound.

The method of treating a sealing compound according to embodiment 1 above involves injecting a treating agent containing at least one of a salt that is a reaction compound of an acid and a base and/or a water-soluble organic solvent into the inside of the pneumatic tire having the sealing compound injected thereinto, mixing the treating agent with the sealing compound inside the pneumatic tire, and aggregating and solidifying the rubber latex in the sealing compound, thereby making it possible to separate the used sealing compound into a solid constituent (rubber latex) and a liquid constituent in the pneumatic tire. Accordingly, also when a pneumatic tire is taken off from the rim, the sealing compound having a relatively high viscosity prior to solid-liquid separation does not splash outside and thus does not adhere to the worker, working facilities, and the like. Therefore, contamination of the worker and working facilities can be prevented.

In other words, if a high viscosity sealing compound prior to solid-liquid separation adheres to the worker, working facilities and the like due to its splash, it is difficult to remove the sealing compound from the worker, working facilities and the like. However, if a used sealing compound is separated into rubber latex and a liquid constituent, and if the liquid constituent formed from the sealing compound splashes when the pneumatic tire is taken off from the rim, the contamination of the worker and work facilities due to this liquid constituent does not substantially pose a problem since this liquid constituent is a low viscosity material containing therein water as a main substance and almost no harmful substances, so that treatment for removing the liquid constituent is easy.

In addition, in the method of treating a sealing compound according to claim 1, an aqueous solution or the like containing therein at least one of a salt that is a reaction compound of an acid and base and/or a water-soluble organic solvent is used. Thus, the addition of the treating agent to the sealing compound rarely renders the rubber latex and liquid constituent formed from the sealing compound harmful such as acidic, or alkaline. Accordingly, treatment for rendering the rubber latex and liquid constituent unharmful or the like can be carried out easily, as compared with the case where a sealing compound is solid-liquid separated using a conventional treating agent containing therein an aqueous acid solution as a main material. Moreover, such a treating agent is low in price and special attention does not need to be paid to storage and control, and thus the production, storage and control costs can be greatly reduced, as compared with a conventional treating agent containing therein an aqueous acid solution as a main material.

The method of treating a sealing compound according to embodiment 2 of the invention is characterized by comprising, in the method of treating a sealing compound of claim 1, after completion of the above solid-liquid separating step, a recovering step of recovering rubber latex as a solid constituent formed from the sealing compound inside the pneumatic tire and a remaining liquid constituent in the sealing compound while separating them.

The method of treating a sealing compound according to embodiment 3 of the invention is characterized by comprising, in the method of treating a sealing compound of claim 1 or 2, injecting into the inside of a pneumatic tire, an aqueous solution having sodium chloride dissolved therein as the treating agent, in the above solid-liquid separating step.

The method of treating a sealing compound according to embodiment 4 of the invention is characterized by comprising, in the method of treating a sealing compound of claim 1 or 2, injecting into the inside of the pneumatic tire, as the treating agent, an aqueous solution containing methanol, ethanol and/or acetone, in the above solid-liquid separating step.

On the other hand, the inventor has paid attention to rubber latex such as NR, NBR, SBR, or the like, which is used as a primary constituent of a sealing compound, and diligently studied and found that the treatment of at least a part of these rubber latexes by solidification enables an efficient treatment of a used sealing compound taken out from a pneumatic tire. Moreover, the inventor has paid attention to the fact that the change of pH by introduction of an acid or base or reduction of the effect of the latex surface as a surfactant by introduction of an alcohol or electrolyte is effective in solidifying latex, and further studied, and has completed the invention.

The invention described in embodiment 5 is characterized by comprising a separating step of adding at least a salt and/or an organic solvent to a used sealing compound containing therein latex including natural rubber and synthetic rubber, and an antifreeze to form a solid constituent, and then separating the above solid constituent and liquid constituent.

Salts (reaction compounds of acids and bases) that are preferred include electrolytes such as common salt (sodium chloride), baking soda (sodium bicarbonate), potassium chloride and the like. Organic solvents that are preferred include water-soluble organic solvents such as alcohols such as methanol and ethanol, acetone and the like. Of these, salts such as common salt are further preferable from the viewpoint of easy procurement.

The amount of introducing these solutions into a sealing compound (repairing liquid) varies depending on the composition of a sealing compound. For example, for a sealing compound containing therein about 30% of a latex constituent, the amount of addition of a saturated common salt solution is within the range of 50 to 300 g, and preferably within the range of 80 to 200 g, per 500 g of the sealing compound. Additionally, the minimum amount of addition that makes the cloudiness of the solution constituent disappear is preferred.

After the separation of the above solution into solid and liquid constituents, the solid constituent is re-utilized for a composition material of a reinforcement material made by addition thereof to a plastic material, or for other applications, or disposed as a noncombustible substance. The liquid constituent is recovered as an industrial waste liquid and is treated.

This industrial waste liquid does not contain therein a latex constituent in contrast to conventional waste liquids. Accordingly, the waste liquid is readily treated. Moreover, the amount of waste liquid can be greatly reduced in contrast to conventional amounts. Also, the sealing compound is generally alkaline, and thus a used sealing compound is neutralized by adjustment of the amount of acid, whereby the separated liquid constituent can be made unharmful.

The invention described in embodiment 6 is characterized in that the above used sealing compound is taken out from a punctured pneumatic tire.

Thus, it is possible to efficiently recover a small amount of sealing compound from the inside of each pneumatic tire and treat the sealing compound.

The invention described in embodiment 7 is characterized in that common salt is added as the above salt.

This renders the effect of a stabilizer (surfactant) surrounding the latex particle surface little, whereby the particles start to agglomerate. Furthermore, as an effect of the addition of common salt as a salt, a special chemical does not need to be used, thereby enabling the improvement of the stability during operation as well as the procurement at the site also.

Moreover, the addition of common salt in a solid state causes the gelation of latex to proceed rapidly, making the material heterogeneous, therefore it is preferable to add the salt as a solution of salt. The concentration of a solution of salt is preferably 5% or more, more preferably 10% or more, and a saturated salt solution is further preferable.

The invention described in embodiment 8 is characterized by comprising an antifreeze reclaiming step of separating and recovering an antifreeze from the above liquid constituent, as a subsequent step of the above separating step.

The liquid constituent contains therein a variety of components. Of these, an antifreeze such as ethylene glycol or propylene glycol is a component capable of being re-utilized. Hence, separation and recovery of this antifreeze enables effective utilization of a resource.

The invention described in embodiment 9 is characterized by comprising a solid-constituent re-utilizing step of re-utilizing the above solid constituent.

The solid constituent primarily contains therein latex. Hence, effective utilization of this solid constituent renders it possible to effectively make use of a resource as in the case of the above antifreeze.

The invention described in embodiment 10 is characterized by comprising an outer case for accommodating a used sealing compound as well as having an openable and closable liquid outlet, an inner case placed inside the above outer case and having a plurality of openings for passage of a liquid constituent, and adding means of adding a specified solution to the inside of the above inner case.

In the invention described in embodiment 10, a used sealing compound is accommodated in the outer case. Additionally, the inner case has a plurality of openings formed therein, and thus the used sealing compound is placed in the inner case as well.

Now, a specified solution is added to the inside of the inner case via the adding means. The specified solution refers to a solution that solidifies a latex constituent of a used sealing compound.

Addition of this solution solidifies the latex constituent contained in the sealing compound within the inner case.

Furthermore, by opening the liquid outlet placed in the outer case, the liquid constituent within the case can be discharged outside the case. Thus, the liquid and solid constituents can be separated.

The invention described in embodiment 11 is characterized by comprising, introducing the above used sealing compound into the inner case.

Thus, the compound can be efficiently solidified.

In the invention described in embodiment 12, the above inner case is characterized by comprising a mesh form.

This makes it possible to readily form a plurality of openings.

The invention described in embodiment 13 is characterized by including rotating means for causing the liquid constituent to flow out from the above openings by centrifugal force caused by rotating the above inner case.

This makes it possible to readily separate the liquid constituent and the solid constituent formed within the inner case in a short time.

Advantages of the Invention

As described above, the method of treating a sealing compound of the invention renders it possible to efficiently separate and recover a used sealing compound into rubber latex and a liquid constituent, as well as to simplify the treatment of the rubber latex and the liquid constituent separated from the used sealing compound.

On the other hand, the above constitution of the invention is capable of efficiently treating a sealing compound at low cost, and also attaining an easy-to-use apparatus for treating a sealing compound.

BEST MODE FOR CARRYING OUT THE INVENTION

FIG. 1A shows an injecting apparatus of a treating liquid (hereinafter, simply called an "injecting apparatus") used in a treating method of a sealing compound in an embodiment of a first aspect of the invention. This injecting apparatus 10 injects a treating liquid 14 into the inside of a pneumatic tire (hereinafter, simply called a "tire") 24 having a puncture temporarily repaired (closed) with a sealing compound 12. For example, the injection apparatus is placed in a gas station, a tire shop, or the like, having tire repairing facilities. The injecting apparatus 10, as shown in FIG. 1A, includes a treating liquid tank 16 having the treating liquid 14 stored therein and a liquid injecting hose 18 connected to this treating liquid tank 16. The base plate portion of the treating liquid tank 16 has a discharge outlet 17 for the treating liquid 14 opened, and to this discharge outlet 17 is connected the base end of the liquid injecting hose 18.

To the liquid injecting hose 20 is connected, at its fore-end, an injecting tube 20 having a smaller diameter than the inner diameter of a tire valve 26 in the tire 24, and also on the base end side of the liquid injection hose is provided an on-off valve 22 for controlling a flow within the hose of the treating liquid 14. The injecting tube 20 can be inserted into the tire 24 by passing through the tire valve 26 that has the valve core pulled out. The treating liquid 14 stored within the treating liquid tank 16 separates the sealing compound 12 into a solid constituent and a liquid constituent. In this embodiment, a saturated salt solution prepared by dissolving sodium chloride (common salt) in water so as to be saturated is used as the treating liquid 14 from the viewpoints of easy procurement, cost, easiness of storage and control, and the like.

On the other hand, as the sealing compound 12, a variety of compounds are presently commercially available. The sealing compounds typically include, for example, materials primarily containing an aqueous solution having a resin-based adhesive added thereto in a state of an aqueous dispersion agent or aqueous emulsion and also containing a rubber latex such as an NR (natural rubber) latex, an SBR (styrene butadiene rubber) latex, an NBR (acrylonitrile-butadiene rubber) latex or the like. To such an aqueous solution are generally added antifreezing agent such as glycol, ethylene glycol, propylene glycol, or the like, a pH adjuster, an emulsifier, a stabilizer and the like and, as required, a fiber material or whisker made of polyester, polypropylene, glass, or the like, a filler made of calcium carbonate, carbon black, or the like, particles of a silicate or polystyrene, in order to improve sealing properties for a puncture.

Next, the procedure of work of treating the sealing compound 12 using the treating liquid 14 in the embodiment will be explained.

A worker in tire repairing facilities, first removes from a vehicle, the tire 24 having a puncture temporarily repaired with the sealing compound 12, pulls out the valve core (not shown) from the tire valve 26 of this tire 24, and then insets the injecting tube 20 into the inside of the tire 24 through the tire valve 26, preferably immerses the end of the injecting tube 20 into the sealing compound 12. In this state, the worker opens the on-off valve 22 of the closed injecting apparatus 10, injects the treating liquid 14 stored within the treating liquid tank 16 into the inside of the tire 24 through the liquid injecting hose 18 and the injecting tube 20, and then adds a specified amount of the treating liquid 14 to the sealing compound 12.

Then, the worker inserts a stopper such as a rubber cap or the like into the tire valve 26, agitates the sealing compound 12 having the treating liquid 14 added thereto within the tire 24 by rotating the tire 24, and uniformly disperses the treating liquid 14 in the sealing compound 12. This makes weak the effect of a stabilizing agent (surfactant) surrounding the particle surfaces of rubber latex in the sealing compound 12, whereby the particles of the rubber latex agglomerate and a gel-like solid constituent starts to form in the sealing compound 12. After the initiation of formation of this solid constituent, when a sufficient time (about within 10 minutes) elapses, the sealing compound 12 separates into rubber latex solidified in a gel-like state inside the tire 24 and a liquid constituent such as remaining water, antifreeze and the like.

At this time, the amount of addition of the treating liquid 14 to the sealing compound 12 is preferably a minimum amount such that the rubber latex contained in the sealing compound 12 is agglomerated roughly in the total amount to obtain a transparent liquid constituent, to decrease the liquid constituent after the solid-liquid separation of the sealing compound 12, but the minimum amount of this treating liquid 14 varies depending on the content of rubber latex in the sealing compound 12. Specifically, when rubber latex (SBR-based) in the sealing compound 12 is 30 wt %, the addition of a saturated salt solution in an amount, as required, set to be from 50 g to 300 g (preferably from 80 g to 200 g) based on 500 g of the sealing compound 12 makes it possible to separate the sealing compound 12 into rubber latex and a liquid constituent.

Additionally, in this embodiment, although a saturated salt solution is used as the treating liquid 14, a solution containing one or both of a salt that is a reaction compound of an acid and a base and/or a water-soluble organic solvent can also be used as the treating liquid 14 other than the salt solution. As a salt capable of composing at least a part of the treating liquid 14, for example, baking soda (sodium bicarbonate), potassium chloride, or sodium sulfate can be employed. As a water-soluble organic solvent capable of composing at least a part of the treating liquid 14, for example, an alcohol such as methanol, ethanol, propanol or the like, or acetone can be used. A solution containing therein one or both of the salt and/or water-soluble organic solvent can be added to the sealing compound 12 as a treating liquid to separate the sealing compound 12 into a solid constituent (rubber latex) and a liquid constituent.

Also, in this embodiment, the treating liquid 14 which is in a liquid state is used for the treatment of the sealing compound 12, in consideration of the facts that the time of reaction with the sealing compound 12 can be reduced effectively and injection of the treating liquid 14 into the tire 24 through the tire valve 26 is easy compared with the case where a salt or the like is added to the sealing compound 12 in a solid state, but the above-mentioned salt may be used in the form of particles or powder as a treating agent. Even when an additive in the form of particles or powder is injected into the tire 24 and thus added to the sealing compound 12, the treatment (solid-liquid separation) of the sealing compound 12 can be carried out sufficiently uniformly and in a short time, if the strength of agitation for the sealing compound 12 having the treating agent added thereto is sufficiently high.

The worker takes the tire 24 off from the rim of the wheel 25 when the sealing compound 12 is separated into rubber latex and a liquid constituent inside the tire 24, and then discharges the gel-like rubber latex and the liquid constituent from the inside of the tire 24 into a waste liquid vessel 28 shown in FIG. 1B. In the opening of this waste liquid vessel 28 is placed a filter vessel 32 fitted with a mesh filter 30. A liquid constituent L of the sealing compound 12 discharged from the inside of the tire 24 is collected into the waste liquid vessel 28 through the mesh filter 30; on the other hand, a gel-like rubber latex R is filtered by means of the mesh filter 30 to deposit on the filter vessel 32. The worker separates respectively the rubber latex, i.e., the solid constituent deposited on the mesh filter 30, and the liquid constituent L collected in the waste liquid vessel 28 and transfers the rubber latex and the liquid constituent to exclusive recovering vessels respectively to store the rubber latex and the liquid constituent until these recovering vessels are almost filled.

The rubber latex R stored within the recovering vessel is subjected to, for example, the removal of impurities, dewatering, drying and the like, and then recycled as a rubber material, or disposed of by incineration, landfill, or the like after dewatering and drying. The liquid constituent L is subjected to, for example, as required, a simple refining treatment such as neutralization, dilution, deposition, or the like, and then discharged to sewer system for industrial waste water and disposed as common waste water in sewerage facilities.

The method of treating a sealing compound in the embodiment as described above involves injecting the treating liquid 14 into the inside of the tire 24 having the sealing compound 12 injected therein, mixing this treating liquid 14 with the sealing compound 12 within the tire 24, aggregating the rubber latex from the sealing compound 12 to solidify, thereby enabling an efficient separation of the used sealing compound 12 into a solid constituent (rubber latex) and a liquid constituent within the tire 24. Hence, when the tire 24 is taken off from the rim of the wheel 25, the sealing compound 12 having a relatively high viscosity prior to solid-liquid separation does not splash outside and thus does not adhere to the worker, working facilities and the like, enabling the prevention of contamination of the worker and working facilities by the sealing compound 12 prior to solid-liquid separation.

In other words, the adherence of a high viscosity sealing compound 12 prior to solid-liquid separation to the worker, work facilities and the like due to its splash renders it difficult to remove the sealing compound from the worker, work facilities and the like. However, if the used sealing compound 12 is separated into rubber latex and a liquid constituent, and even if the liquid constituent formed from the sealing compound 12 is splashed when the tire 24 is taken off from the rim of the wheel 25, the contamination of the worker and working area due to this liquid constituent does not substantially pose a problem since this liquid constituent is a low viscosity material containing therein water as a main substance and almost no harmful substances, so that treatment for removing the liquid constituent is easy.

In addition, in the method of treating a sealing compound in the embodiment, a saturated salt solution is used as the treating liquid 14 used for the solid-liquid separation of the sealing compound 12. Thus, the addition of this treating liquid 14 to the sealing compound 12 rarely renders the rubber latex and liquid constituent formed from the sealing compound 12 harmful such as acidic, or alkaline. Accordingly, the treatment for rendering the rubber latex and liquid constituent unharmful or the like is easily carried out, as compared with the case where a sealing compound is solid-liquid separated using a conventional treating agent containing therein an aqueous acid solution as a main material. Moreover, such a treating liquid is low in price and special attention does not need to be paid to storage and control, and thus the production, storage and control costs can be greatly reduced, as compared with a conventional treating agent containing therein an aqueous acid solution as a main material.

Hereinafter, an embodiment (particularly separating step) of a second aspect of the invention will be described. As indicated in FIG. 2, a sealing compound recovering apparatus 50 in an embodiment of the invention includes an outer case 52 accommodating a used repairing liquid (sealing compound) taken off from a pneumatic tire, a net-like mesh case 54 placed inside the outer case 52, a charging port 56 of charging the repairing liquid into the mesh case 54, an agitating blade 58 of agitating the repairing liquid within the mesh case (inner case) 54, an agitating motor 60 of rotating the agitating blade 58, a dewatering motor 62 of rotating the mesh case 54 for removing a liquid constituent from the inside of the mesh case 54, and a waste water line 64 connected to the outer case 52.

The agitating motor 60 and the dewatering motor 62 can be changed in the number of revolutions. The waste water line 64 is provided with a freely on-off waste water stopper 66.

The number of revolutions of the agitating motor 60 is preferably within the range of 300 to 1500 rpm from the viewpoint of uniform agitation. At lower than 300 rpm, a sufficient agitation effect is hardly obtained, and at higher than 1500 rpm, the liquid is splashed and uniform agitation is difficult to perform. The number of revolutions is preferably within the range of 400 to 1000 rpm.

The dewatering motor 62 is provided to separate a solid material formed within the mesh case 54 from the liquid, and the number of revolutions is preferably within the range of 300 to 3000 rpm. At lower than 300 rpm, a sufficient dewatering effect is hard to obtain, and at higher than 3000 rpm, when solid content is maldistributed, a uniform rotation is hard to obtain.

The capacity of the outer case 52 is not particularly limited, but a capacity of about 1.5 to about 2 L suitable for treating a repairing liquid of about 1 L is preferable from the viewpoint of compactness.

In the embodiment, the used repairing liquid taken out of the pneumatic tire is poured from the charging port (adding means) 56 into the mesh case 54. Furthermore, the agitating motor 60 is driven to rotate the agitating blade 58 and also a solution for solidifying the latex constituent of the repairing liquid is poured from the charging port 56 only in a necessary amount. As a result, the latex constituent becomes a solid constituent within the mesh case 54.

Additionally, as a "sealing compound", a variety of sealing compounds are presently commercially available and the sealing compounds typically include the following, i.e., materials primarily containing an aqueous solution having a resin-based adhesive added thereto in a state of an aqueous dispersion agent or aqueous emulsion and also containing a rubber latex containing NR (natural rubber) or synthetic rubber such as SBR (styrene butadiene rubber), NBR (acrylonitrile-butadiene rubber) or the like or a mixture of both. In such an aqueous solution is contained an antifreeze (antifreezing agent) such as glycol, ethylene glycol, propylene glycol, or the like. In addition, a pH adjuster, an emulsifier, a stabilizer and the like are generally added and, as required, a fiber material or whisker made of polyester, polypropylene, glass, or the like, a filler made of calcium carbonate, carbon black, or the like, and particles of a silicate or polystyrene are added in order to improve sealing properties for a puncture.

In the invention, a sealing compound at neutral or weak alkaline pH (pH: 8 to 11) is preferably used. Use of such a sealing compound can eliminate the need for a complicated step other than the separating step in the invention.

Namely, even injection of a treating agent primarily having an aqueous acid solution described in Patent Document 1 into such a sealing compound at neutral or roughly neutral pH makes it possible to separate the sealing compound into a solid constituent (rubber latex) and a liquid constituent. The aggregated rubber latex, however, contains an acidic solution and the remaining liquid constituent becomes an acidic solution. As such, the rubber latex and the liquid constituent each must be neutralization-treated in different steps in order to make them unharmful, thereby rather increasing the cost and time for treating the sealing compound. To the contrary, according to the invention, such complicated treatments can be eliminated.

Further, the dewatering motor 62 is run to rotate the mesh case 54. As a consequence, the liquid constituent is moved to the outside of the mesh case 54, and only the solid constituent that cannot pass through the mesh case 54 remains within the mesh case 54. In this way, the solid constituent and liquid constituent can be separated (separating step).

After the solid-constituent re-utilizing step of re-utilizing the solid constituent, the solid constituent can be re-utilized such as a composition material of a reinforcement material. When the material is unable to be re-utilized, it is disposed as an incombustible substance. The methods of re-utilization include thermal recycling as described above. Other applications include usage as a thickening agent of a rubber material, and thermal material recycling as a solid rubber such as reusing by mixing with waste tire recycled rubber.

The liquid constituent is recovered as industrial waste liquid and is treated. This industrial waste liquid does not contain a latex constituent, in contrast to conventional waste liquids. Therefore, it is easy to treat the waste water. Additionally, the waste-water amount can be greatly reduced as compared with the conventional amounts.

An antifreeze recycling step of separating and recovering the antifreeze from the liquid constituent is preferably provided as a subsequent step of the above-described separating step in order to make effective use of the antifreeze in the liquid constituent. A membrane separation technique can be applied to the separating and recovering means of an antifreeze in the step, which is carried out specifically by preferably using a microfiltration membrane or reverse osmosis membrane. An antifreeze obtained through the antifreeze recycling step has, as required, a variety of known additives added thereto, and can be utilized again as a raw material of a puncture sealing compound.

Example 1

In the example, the outer case 52 had a capacity of 1.5 L, and the mesh case 54 had a capacity of 1.45 L and 100 mesh. In addition, the agitating motor 60 used a motor having a variable revolution number of 200 to 1000 rpm at 60 W, and the dewatering motor used a motor having a variable revolution number of 500 to 3000 rpm at 150 W.

In the example, first, a used repairing liquid was taken out of the pneumatic tire 70 through the hose 72 by absorption (see FIG. 3), and 1 L of the used repairing liquid was poured into the mesh case 54, and then the liquid was agitated by means of the agitating motor 60 at a revolution of 3000 rpm. In this state, 100 mL of a saturated salt solution (temperature: 25° C.) was gradually poured into the mesh case 54, and after the completion of charging, the resulting material was agitated for 5 to 15 min.

Then, the liquid accommodated in the mesh case 54 was ensured not to be opaque, and then the agitation was stopped.

Moreover, the waste water stopper 66 was opened, and the dewatering motor 62 was rotated to start rotation of the mesh case 54. Thereafter, the revolution number was gradually increased from 800 rpm to 1200 rpm, whereby the resulting material was sufficiently capable of being separated into a liquid constituent and a solid constituent in a short time.

Then, the liquid constituent was treated as an industrial waste liquid and the solid constituent could be re-utilized as a plastic reinforcement material.

Thus far, embodiments of the invention were set forth using embodiments, but the above embodiments are illustrative, and many changes can be made to the invention without departing from the scope of the invention. In addition, it should be understood that this invention is not to be unduly limited to the above embodiments.

DESCRIPTION OF THE SYMBOLS

Figure 1A:
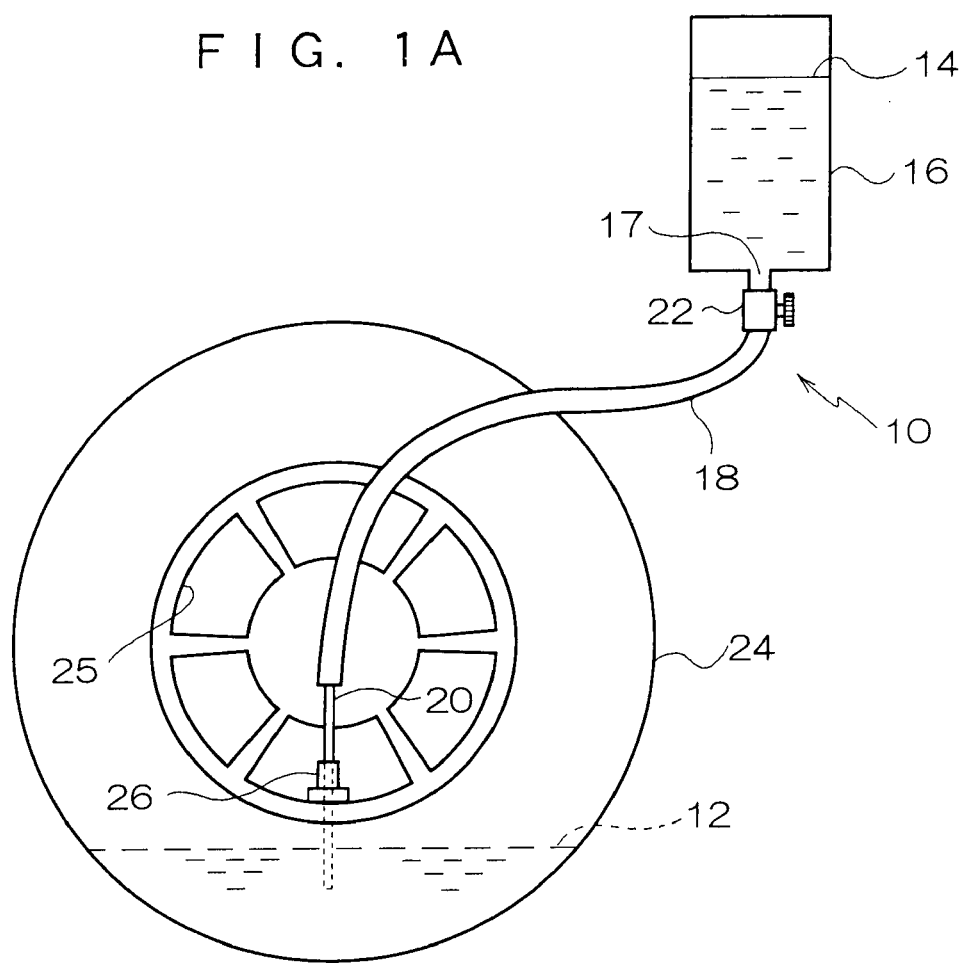
FIG. 1A is a structural view indicating an injecting apparatus of a treating liquid used for a method of treating a sealing compound in an embodiment of the invention.
Figure 1B:
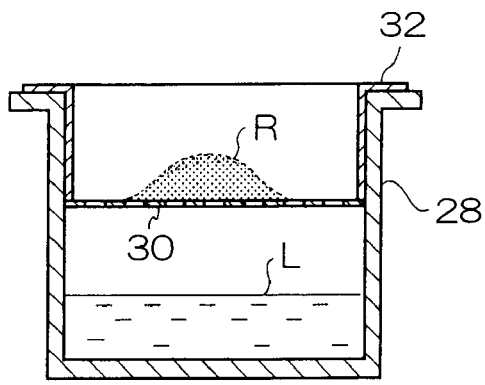
FIG. 1B is a structural view indicating a discharging vessel of a sealing compound used for a method of treating a sealing compound in an embodiment of the invention.
Figure 2:
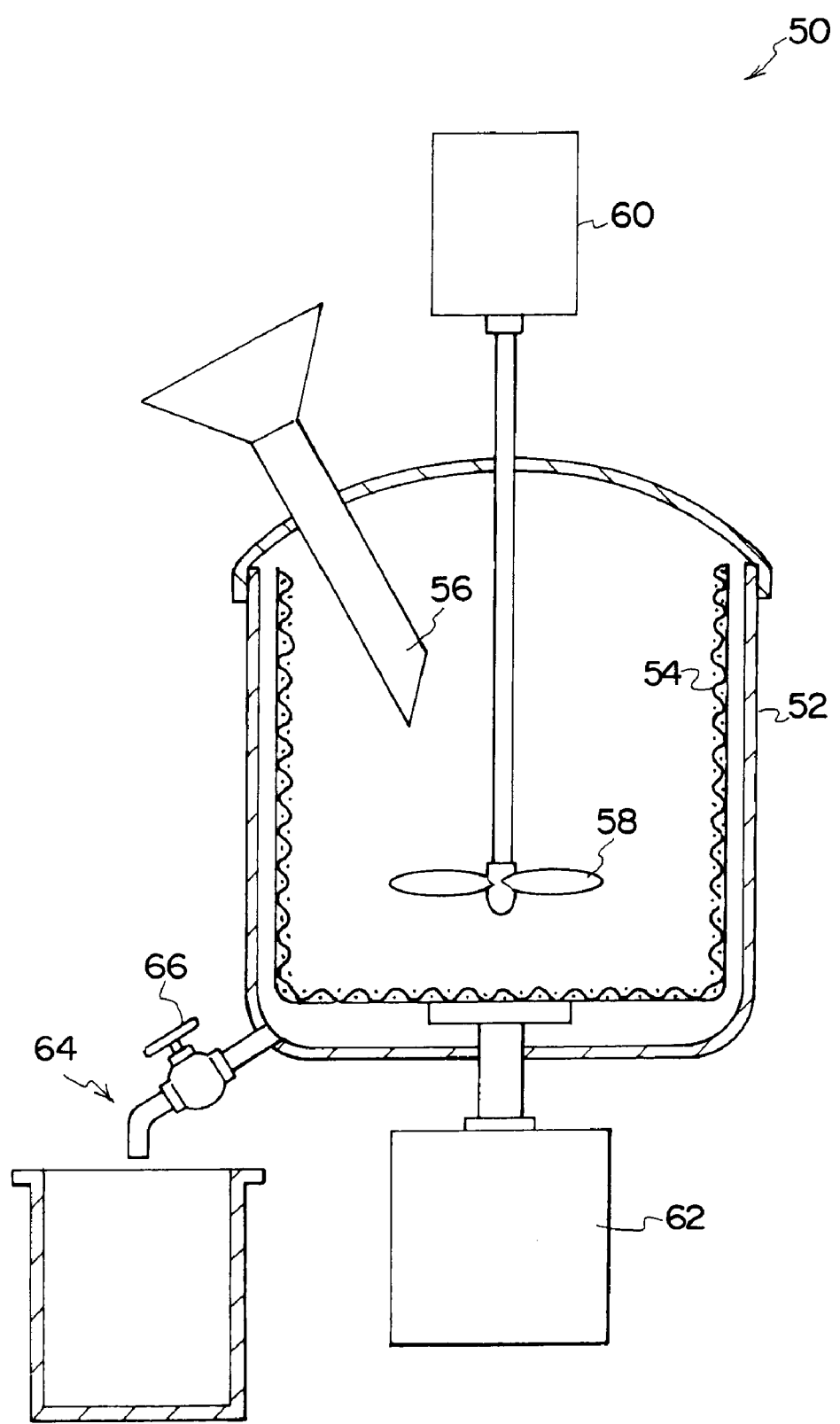
FIG. 2 is a side sectional view indicating a configuration of a sealing compound recovering apparatus in an embodiment of the invention.
Figure 3:
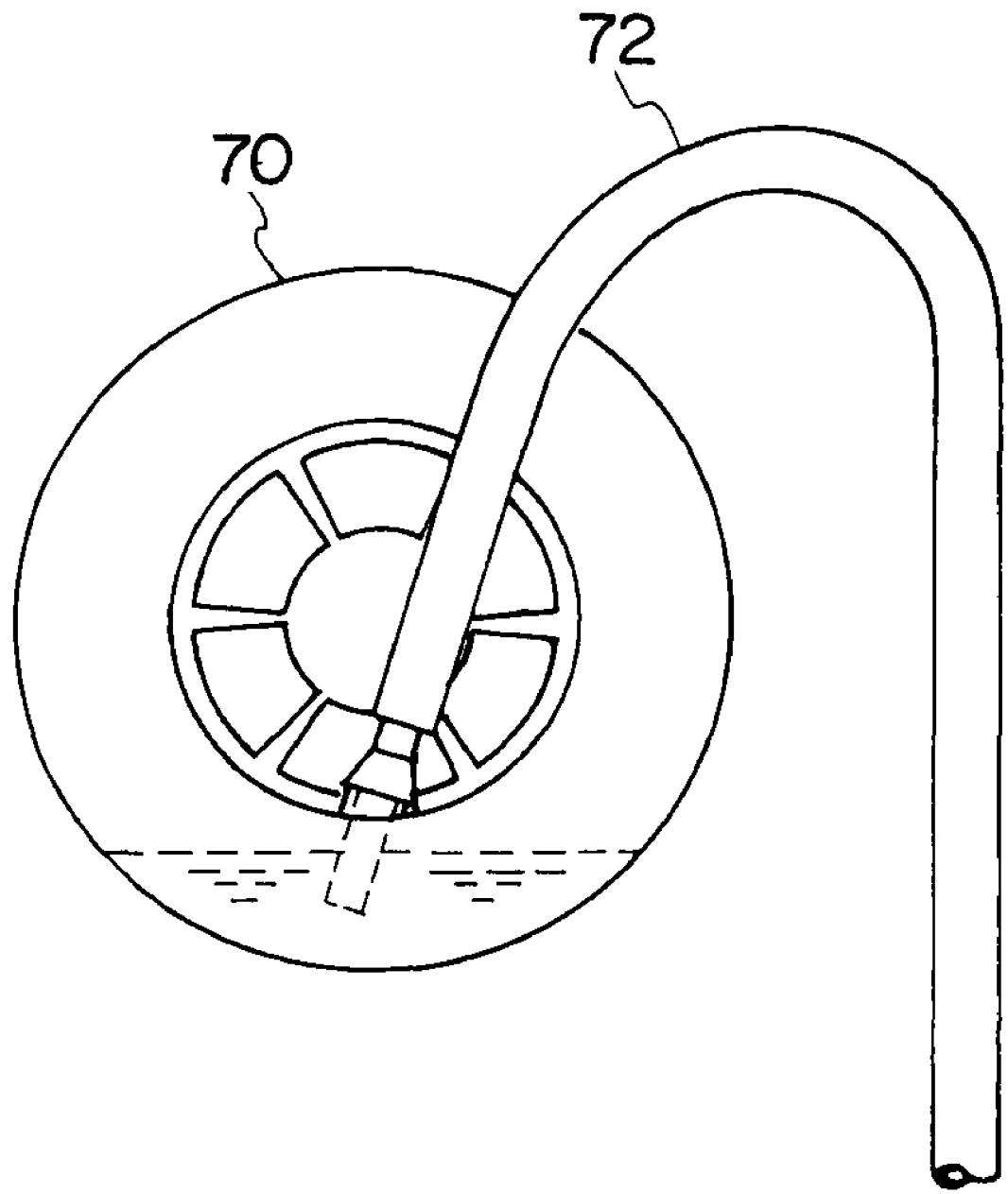
FIG. 3 is a side view indicating that a used sealing compound within a pneumatic tire is taken out through a hose by absorption in an example.

12: Sealing compound
14: Treating liquid
24: Tire
25: Wheel
50: Sealing compound recovering apparatus
52: Outer case
54: Mesh case (Inner case)
56: Charging port (Adding means)
62: Dewatering motor (Rotating means)
64: Waste water line (Liquid discharging port)
70: Pneumatic tire

What is claimed is:

1. A method of treating a sealing compound, in order to recover from the inside of a pneumatic tire the sealing compound that was used for repairing a puncture, the sealing compound including an aqueous solution having at least rubber latex dispersed therein, the method comprising:
    solid-liquid separating, by injecting a treating agent into the inside of a pneumatic tire into which the sealing compound was injected, the treating agent being an aqueous solution comprising sodium chloride dissolved therein and alcohol, mixing the treating agent with the sealing compound inside the pneumatic tire, and aggregating and solidifying the rubber latex in the sealing compound.

2. The method of treating a sealing compound according to claim 1, further comprising, after completion of the solid-liquid separating:
    recovering from inside the pneumatic tire, while separating, the rubber latex as a solid constituent formed from the sealing compound and a remaining liquid constituent of the sealing compound.

3. The method of treating a sealing compound according to claim 1, wherein the treating agent further comprises acetone.

4. The method of treating a sealing compound according to claim 2, wherein the treating agent further comprises acetone.

5. A method of treating a sealing compound, the method comprising:
    separating, by adding sodium chloride and alcohol to a sealing compound comprising latex, the latex including natural rubber and/or synthetic rubber, and an antifreeze, to form a solid constituent; and then
    separating the solid constituent and a liquid constituent,
    wherein the alcohol is at least one selected from the group consisting of methanol, ethanol and propanol.

6. The method of treating a sealing compound according to claim 5, wherein the used sealing compound is taken out from a punctured pneumatic tire.

7. The method of treating a sealing compound according to claim 5, further comprising, after separating: antifreeze recovering, of separating and recovering the antifreeze from the liquid constituent.

8. The method of treating a sealing compound according to claim 5, further comprising: solid-constituent re-utilizing, of re-utilizing the solid constituent.

* * * * *